United States Patent
Kuzuhara et al.

(10) Patent No.: US 10,281,722 B2
(45) Date of Patent: May 7, 2019

(54) HEAD-UP DISPLAY AND MOVING BODY EQUIPPED WITH HEAD-UP DISPLAY

(71) Applicant: Panasonic Intellectual Property Management Co., Ltd., Osaka (JP)

(72) Inventors: Satoshi Kuzuhara, Osaka (JP); Masafumi Sueyoshi, Kanagawa (JP); Hiroaki Okayama, Nara (JP); Katsuhiko Hayashi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/728,543

(22) Filed: Oct. 10, 2017

(65) Prior Publication Data
US 2018/0039077 A1 Feb. 8, 2018

Related U.S. Application Data

(63) Continuation-in-part of application No. PCT/JP2016/003029, filed on Jun. 23, 2016.

(30) Foreign Application Priority Data

Jun. 26, 2015 (JP) .................. 2015-128943

(51) Int. Cl.
*G02B 27/14* (2006.01)
*G02B 27/01* (2006.01)
(Continued)

(52) U.S. Cl.
CPC .......... *G02B 27/0101* (2013.01); *B60K 35/00* (2013.01); *B60R 11/02* (2013.01);
(Continued)

(58) Field of Classification Search
CPC ................................. G02B 27/0101
(Continued)

(56) References Cited

U.S. PATENT DOCUMENTS

| 5,436,763 A | 7/1995 | Chen et al. |
| 6,902,282 B2 | 6/2005 | Cook |

(Continued)

FOREIGN PATENT DOCUMENTS

| JP | 7-159718 | 6/1995 |
| JP | 8-286140 A | 11/1996 |
| JP | 2008-180759 | 8/2008 |
| JP | 2009-150947 | 7/2009 |
| JP | 2010-256867 | 11/2010 |
| JP | 2013-061554 | 4/2013 |
| JP | 2014-130269 | 7/2014 |

OTHER PUBLICATIONS

The Extended European Search Report dated Mar. 6, 2018 for the related European Patent Application No. 16813967.3.
(Continued)

*Primary Examiner* — James C. Jones
(74) *Attorney, Agent, or Firm* — Greenblum & Bernstein, P.L.C.

(57) ABSTRACT

A head-up display projects an image on a windshield to allow a viewer to visually observe a virtual image. The head-up display includes a display device, a relay optical system, and a projection optical system. The display device displays an image. The relay optical system provides the image displayed by the display device as an intermediate image. The projection optical system reflects the intermediate image provided by the relay optical system to project the intermediate image on the windshield.

12 Claims, 15 Drawing Sheets

(51) Int. Cl.
  *B60K 35/00* (2006.01)
  *B60R 11/02* (2006.01)
  *G02B 17/06* (2006.01)
  *G02B 17/08* (2006.01)

(52) U.S. Cl.
  CPC ......... *G02B 27/01* (2013.01); *G02B 27/0176* (2013.01); *G02B 17/0663* (2013.01); *G02B 17/0816* (2013.01); *G02B 27/0179* (2013.01); *G02B 2027/011* (2013.01); *G02B 2027/013* (2013.01); *G02B 2027/014* (2013.01); *G02B 2027/0145* (2013.01); *G02B 2027/0154* (2013.01); *G02B 2027/0185* (2013.01)

(58) Field of Classification Search
  USPC ........................................................ 359/630
  See application file for complete search history.

(56) References Cited

U.S. PATENT DOCUMENTS

| | | | |
|---|---|---|---|
| 2009/0160736 A1* | 6/2009 | Shikita | G02B 27/0101 345/7 |
| 2013/0063754 A1 | 3/2013 | Saisho et al. | |
| 2014/0049819 A1 | 2/2014 | Piehler | |
| 2014/0247433 A1* | 9/2014 | Piehler | G03B 21/14 353/94 |

OTHER PUBLICATIONS

International Search Report of PCT application No. PCT/JP2016/003029 dated Aug. 30, 2016.

\* cited by examiner

FIG. 5

| | SURFACE NUMBER | SHAPE | REFRACTIVE INDEX | ABBE NUMBER | ECCENTRICITY DATA | | | | | |
|---|---|---|---|---|---|---|---|---|---|---|
| | | | | | X | Y | Z | ADE | BDE | CDE |
| DISPLAY SURFACE | 1 | | | | 0 | 0 | 0 | 0 | 0 | 0 |
| FIRST MIRROR | 2 | freeform surface | | | 1.583 | 24.197 | 102.158 | 3.278 | -0.785 | -0.522 |
| SECOND MIRROR | 3 | freeform surface | | | 0.512 | 34.805 | 12.792 | 7.231 | -0.819 | -0.466 |
| THIRD MIRROR | 4 | freeform surface | | | 1.937 | 67.394 | 96.672 | 2.230 | -0.775 | -8.523 |
| FOURTH MIRROR | 5 | freeform surface | | | 0.671 | 104.875 | -27.707 | 3.231 | -0.785 | -3.522 |
| WINDSHIELD | 6 | freeform surface | | | 47.191 | 236.676 | 254.185 | 148.012 | -5.949 | 11.841 |
| VIEWER | 7 | | | | -68.622 | -148.624 | 983.474 | 148.012 | -5.949 | 11.841 |

FIG. 6

| SURFACE NUMBER | RADIUS OF CURVATURE |
|---|---|
| 2 | -184.5 |
| 3 | 1137.1 |
| 4 | -482.6 |
| 5 | -2087.2 |
| 6 | -430.0 |

FIG. 7

| SURFACE NUMBER | POLYNOMIAL COEFFICIENT | | | | | | | |
|---|---|---|---|---|---|---|---|---|
| 2 | C1 | 0.00E+00 | C19 | -3.97E-10 | C37 | 0.00E+00 | C55 | 0.00E+00 |
| | C2 | 0.00E+00 | C20 | 7.68E-11 | C38 | 0.00E+00 | C56 | 0.00E+00 |
| | C3 | 0.00E+00 | C21 | -3.87E-10 | C39 | 0.00E+00 | C57 | 0.00E+00 |
| | C4 | -1.43E-03 | C22 | -3.71E-12 | C40 | 0.00E+00 | C58 | 0.00E+00 |
| | C5 | 5.44E-05 | C23 | 3.27E-13 | C41 | 0.00E+00 | C59 | 0.00E+00 |
| | C6 | -7.86E-04 | C24 | -8.80E-12 | C42 | 0.00E+00 | C60 | 0.00E+00 |
| | C7 | -1.12E-07 | C25 | 9.95E-13 | C43 | 0.00E+00 | C61 | 0.00E+00 |
| | C8 | -1.39E-06 | C26 | -6.25E-12 | C44 | 0.00E+00 | C62 | 0.00E+00 |
| | C9 | 4.46E-07 | C27 | 3.55E-12 | C45 | 0.00E+00 | C63 | 0.00E+00 |
| | C10 | -6.63E-07 | C28 | -1.72E-11 | C46 | 0.00E+00 | C64 | 0.00E+00 |
| | C11 | -5.30E-08 | C29 | 0.00E+00 | C47 | 0.00E+00 | C65 | 0.00E+00 |
| | C12 | 1.79E-09 | C30 | 0.00E+00 | C48 | 0.00E+00 | C66 | 0.00E+00 |
| | C13 | -7.19E-08 | C31 | 0.00E+00 | C49 | 0.00E+00 | | |
| | C14 | 3.72E-10 | C32 | 0.00E+00 | C50 | 0.00E+00 | | |
| | C15 | -1.21E-08 | C33 | 0.00E+00 | C51 | 0.00E+00 | | |
| | C16 | -1.40E-11 | C34 | 0.00E+00 | C52 | 0.00E+00 | | |
| | C17 | -1.75E-10 | C35 | 0.00E+00 | C53 | 0.00E+00 | | |
| | C18 | 2.90E-11 | C36 | 0.00E+00 | C54 | 0.00E+00 | | |
| 3 | C1 | 0.00E+00 | C19 | -9.01E-09 | C37 | 0.00E+00 | C55 | 0.00E+00 |
| | C2 | 0.00E+00 | C20 | 5.48E-10 | C38 | 0.00E+00 | C56 | 0.00E+00 |
| | C3 | 0.00E+00 | C21 | -4.71E-09 | C39 | 0.00E+00 | C57 | 0.00E+00 |
| | C4 | -1.09E-03 | C22 | -6.59E-11 | C40 | 0.00E+00 | C58 | 0.00E+00 |
| | C5 | 1.49E-04 | C23 | -1.85E-12 | C41 | 0.00E+00 | C59 | 0.00E+00 |
| | C6 | 2.97E-04 | C24 | -1.44E-10 | C42 | 0.00E+00 | C60 | 0.00E+00 |
| | C7 | -9.95E-07 | C25 | 2.85E-11 | C43 | 0.00E+00 | C61 | 0.00E+00 |
| | C8 | -2.19E-05 | C26 | -3.14E-11 | C44 | 0.00E+00 | C62 | 0.00E+00 |
| | C9 | 3.32E-06 | C27 | -1.27E-11 | C45 | 0.00E+00 | C63 | 0.00E+00 |
| | C10 | -1.08E-05 | C28 | -2.00E-10 | C46 | 0.00E+00 | C64 | 0.00E+00 |
| | C11 | -3.33E-07 | C29 | 0.00E+00 | C47 | 0.00E+00 | C65 | 0.00E+00 |
| | C12 | 4.46E-08 | C30 | 0.00E+00 | C48 | 0.00E+00 | C66 | 0.00E+00 |
| | C13 | -5.27E-07 | C31 | 0.00E+00 | C49 | 0.00E+00 | | |
| | C14 | 5.86E-08 | C32 | 0.00E+00 | C50 | 0.00E+00 | | |
| | C15 | -1.23E-07 | C33 | 0.00E+00 | C51 | 0.00E+00 | | |
| | C16 | -7.87E-11 | C34 | 0.00E+00 | C52 | 0.00E+00 | | |
| | C17 | -7.42E-09 | C35 | 0.00E+00 | C53 | 0.00E+00 | | |
| | C18 | 1.51E-09 | C36 | 0.00E+00 | C54 | 0.00E+00 | | |

FIG. 8

| SURFACE NUMBER | POLYNOMIAL COEFFICIENT | | | | | | | | |
|---|---|---|---|---|---|---|---|---|---|
| 4 | C1 | 0.00E+00 | C19 | 1.49E-07 | C37 | 0.00E+00 | C55 | 0.00E+00 |
| | C2 | 0.00E+00 | C20 | -3.50E-07 | C38 | 0.00E+00 | C56 | 0.00E+00 |
| | C3 | 0.00E+00 | C21 | 7.40E-07 | C39 | 0.00E+00 | C57 | 0.00E+00 |
| | C4 | 4.94E-03 | C22 | -3.78E-11 | C40 | 0.00E+00 | C58 | 0.00E+00 |
| | C5 | -2.70E-04 | C23 | 1.04E-10 | C41 | 0.00E+00 | C59 | 0.00E+00 |
| | C6 | 6.36E-03 | C24 | -4.98E-10 | C42 | 0.00E+00 | C60 | 0.00E+00 |
| | C7 | 1.12E-05 | C25 | 1.17E-09 | C43 | 0.00E+00 | C61 | 0.00E+00 |
| | C8 | -5.00E-05 | C26 | -7.80E-09 | C44 | 0.00E+00 | C62 | 0.00E+00 |
| | C9 | 3.95E-05 | C27 | 2.33E-08 | C45 | 0.00E+00 | C63 | 0.00E+00 |
| | C10 | -1.55E-04 | C28 | -3.33E-08 | C46 | 0.00E+00 | C64 | 0.00E+00 |
| | C11 | -2.01E-07 | C29 | 0.00E+00 | C47 | 0.00E+00 | C65 | 0.00E+00 |
| | C12 | 7.68E-08 | C30 | 0.00E+00 | C48 | 0.00E+00 | C66 | 0.00E+00 |
| | C13 | -8.49E-07 | C31 | 0.00E+00 | C49 | 0.00E+00 | | |
| | C14 | -4.53E-07 | C32 | 0.00E+00 | C50 | 0.00E+00 | | |
| | C15 | -1.19E-07 | C33 | 0.00E+00 | C51 | 0.00E+00 | | |
| | C16 | -2.33E-09 | C34 | 0.00E+00 | C52 | 0.00E+00 | | |
| | C17 | 1.74E-08 | C35 | 0.00E+00 | C53 | 0.00E+00 | | |
| | C18 | -3.70E-08 | C36 | 0.00E+00 | C54 | 0.00E+00 | | |
| 5 | C1 | 0.00E+00 | C19 | -3.50E-12 | C37 | 0.00E+00 | C55 | 0.00E+00 |
| | C2 | 0.00E+00 | C20 | 4.58E-12 | C38 | 0.00E+00 | C56 | 0.00E+00 |
| | C3 | 0.00E+00 | C21 | 3.04E-11 | C39 | 0.00E+00 | C57 | 0.00E+00 |
| | C4 | 1.95E-03 | C22 | -2.26E-15 | C40 | 0.00E+00 | C58 | 0.00E+00 |
| | C5 | 2.47E-05 | C23 | -3.96E-15 | C41 | 0.00E+00 | C59 | 0.00E+00 |
| | C6 | 1.73E-03 | C24 | -7.83E-15 | C42 | 0.00E+00 | C60 | 0.00E+00 |
| | C7 | 1.27E-07 | C25 | -2.54E-14 | C43 | 0.00E+00 | C61 | 0.00E+00 |
| | C8 | -1.80E-06 | C26 | 5.08E-14 | C44 | 0.00E+00 | C62 | 0.00E+00 |
| | C9 | 1.63E-08 | C27 | 6.34E-14 | C45 | 0.00E+00 | C63 | 0.00E+00 |
| | C10 | -1.73E-06 | C28 | -3.00E-13 | C46 | 0.00E+00 | C64 | 0.00E+00 |
| | C11 | 1.63E-09 | C29 | 0.00E+00 | C47 | 0.00E+00 | C65 | 0.00E+00 |
| | C12 | -1.70E-10 | C30 | 0.00E+00 | C48 | 0.00E+00 | C66 | 0.00E+00 |
| | C13 | 3.37E-09 | C31 | 0.00E+00 | C49 | 0.00E+00 | | |
| | C14 | -4.00E-10 | C32 | 0.00E+00 | C50 | 0.00E+00 | | |
| | C15 | 1.17E-09 | C33 | 0.00E+00 | C51 | 0.00E+00 | | |
| | C16 | 5.18E-13 | C34 | 0.00E+00 | C52 | 0.00E+00 | | |
| | C17 | -3.26E-12 | C35 | 0.00E+00 | C53 | 0.00E+00 | | |
| | C18 | 7.32E-13 | C36 | 0.00E+00 | C54 | 0.00E+00 | | |

FIG. 9

| SURFACE NUMBER | POLYNOMIAL COEFFICIENT | | | | | | | |
|---|---|---|---|---|---|---|---|---|
| 6 | C1 | 0.00E+00 | C19 | 1.51E-12 | C37 | 1.80E-21 | C55 | 0.00E+00 |
| | C2 | 1.93E-01 | C20 | 6.21E-12 | C38 | 1.60E-21 | C56 | 0.00E+00 |
| | C3 | 1.76E+00 | C21 | 1.00E-11 | C39 | -1.24E-20 | C57 | 0.00E+00 |
| | C4 | 8.25E-04 | C22 | 4.27E-15 | C40 | 7.84E-21 | C58 | 0.00E+00 |
| | C5 | -8.58E-06 | C23 | -3.90E-15 | C41 | -2.19E-20 | C59 | 0.00E+00 |
| | C6 | 3.26E-04 | C24 | 5.78E-15 | C42 | -5.71E-20 | C60 | 0.00E+00 |
| | C7 | 5.36E-08 | C25 | -1.46E-14 | C43 | 5.62E-20 | C61 | 0.00E+00 |
| | C8 | 5.80E-08 | C26 | 6.04E-15 | C44 | 8.07E-23 | C62 | 0.00E+00 |
| | C9 | 1.49E-07 | C27 | 4.91E-15 | C45 | -3.96E-21 | C63 | 0.00E+00 |
| | C10 | 1.14E-06 | C28 | -2.71E-14 | C46 | 0.00E+00 | C64 | 0.00E+00 |
| | C11 | 1.46E-09 | C29 | -1.11E-18 | C47 | 0.00E+00 | C65 | 0.00E+00 |
| | C12 | 1.16E-11 | C30 | 4.43E-18 | C48 | 0.00E+00 | C66 | 0.00E+00 |
| | C13 | 2.54E-09 | C31 | 3.85E-17 | C49 | 0.00E+00 | | |
| | C14 | -8.85E-10 | C32 | 9.94E-17 | C50 | 0.00E+00 | | |
| | C15 | -9.76E-10 | C33 | 2.29E-17 | C51 | 0.00E+00 | | |
| | C16 | 8.38E-14 | C34 | -5.39E-17 | C52 | 0.00E+00 | | |
| | C17 | -6.97E-14 | C35 | -4.83E-17 | C53 | 0.00E+00 | | |
| | C18 | 3.71E-13 | C36 | 3.04E-17 | C54 | 0.00E+00 | | |

FIG. 10

| SURFACE | SHAPE | REFRACTIVE INDEX | ABBE NUMBER | ECCENTRICITY DATA ||||||
|---|---|---|---|---|---|---|---|---|---|
| NUMBER | | | | X | Y | Z | ADE | BDE | CDE |
| DISPLAY SURFACE | 1 | | | | 0 | 0 | 0 | 0 | 0 | 0 |
| FIRST MIRROR | 2 | freeform surface | | | 1.974 | 42.957 | 159.941 | 6.038 | -0.987 | 1.869 |
| SECOND MIRROR | 3 | freeform surface | | | -2.553 | 53.521 | -44.387 | 7.037 | -0.954 | 1.886 |
| THIRD MIRROR | 4 | freeform surface | | | -0.351 | 113.835 | 152.493 | 2.039 | -1.115 | -6.192 |
| FOURTH MIRROR | 5 | freeform surface | | | -5.194 | 154.186 | -22.859 | 7.037 | -0.954 | -1.114 |
| WINDSHIELD | 6 | freeform surface | | | 37.718 | 283.890 | 191.137 | 151.610 | -6.786 | 11.620 |
| VIEWER | 7 | | | | -90.330 | -54.129 | 941.523 | 151.610 | -6.786 | 11.620 |

FIG. 11

| SURFACE NUMBER | RADIUS OF CURVATURE |
|---|---|
| 2 | -217.8 |
| 3 | 687.3 |
| 4 | -1039.5 |
| 5 | 2486.3 |
| 6 | -430.0 |

FIG. 12

| SURFACE NUMBER | POLYNOMIAL COEFFICIENT | | | | | | | |
|---|---|---|---|---|---|---|---|---|
| 2 | C1 | 0.00E+00 | C19 | 0.00E+00 | C37 | 0.00E+00 | C55 | 0.00E+00 |
| | C2 | 0.00E+00 | C20 | 0.00E+00 | C38 | 0.00E+00 | C56 | 0.00E+00 |
| | C3 | 0.00E+00 | C21 | 0.00E+00 | C39 | 0.00E+00 | C57 | 0.00E+00 |
| | C4 | 1.24E-05 | C22 | 0.00E+00 | C40 | 0.00E+00 | C58 | 0.00E+00 |
| | C5 | 6.35E-05 | C23 | 0.00E+00 | C41 | 0.00E+00 | C59 | 0.00E+00 |
| | C6 | 2.03E-04 | C24 | 0.00E+00 | C42 | 0.00E+00 | C60 | 0.00E+00 |
| | C7 | -3.51E-08 | C25 | 0.00E+00 | C43 | 0.00E+00 | C61 | 0.00E+00 |
| | C8 | 1.87E-07 | C26 | 0.00E+00 | C44 | 0.00E+00 | C62 | 0.00E+00 |
| | C9 | 8.00E-08 | C27 | 0.00E+00 | C45 | 0.00E+00 | C63 | 0.00E+00 |
| | C10 | 5.42E-07 | C28 | 0.00E+00 | C46 | 0.00E+00 | C64 | 0.00E+00 |
| | C11 | 3.10E-10 | C29 | 0.00E+00 | C47 | 0.00E+00 | C65 | 0.00E+00 |
| | C12 | 9.09E-10 | C30 | 0.00E+00 | C48 | 0.00E+00 | C66 | 0.00E+00 |
| | C13 | 2.27E-09 | C31 | 0.00E+00 | C49 | 0.00E+00 | | |
| | C14 | 6.95E-10 | C32 | 0.00E+00 | C50 | 0.00E+00 | | |
| | C15 | 3.65E-10 | C33 | 0.00E+00 | C51 | 0.00E+00 | | |
| | C16 | 0.00E+00 | C34 | 0.00E+00 | C52 | 0.00E+00 | | |
| | C17 | 0.00E+00 | C35 | 0.00E+00 | C53 | 0.00E+00 | | |
| | C18 | 0.00E+00 | C36 | 0.00E+00 | C54 | 0.00E+00 | | |
| 3 | C1 | 0.00E+00 | C19 | 0.00E+00 | C37 | 0.00E+00 | C55 | 0.00E+00 |
| | C2 | 0.00E+00 | C20 | 0.00E+00 | C38 | 0.00E+00 | C56 | 0.00E+00 |
| | C3 | 0.00E+00 | C21 | 0.00E+00 | C39 | 0.00E+00 | C57 | 0.00E+00 |
| | C4 | -9.12E-04 | C22 | 0.00E+00 | C40 | 0.00E+00 | C58 | 0.00E+00 |
| | C5 | 1.98E-04 | C23 | 0.00E+00 | C41 | 0.00E+00 | C59 | 0.00E+00 |
| | C6 | -5.68E-04 | C24 | 0.00E+00 | C42 | 0.00E+00 | C60 | 0.00E+00 |
| | C7 | -1.13E-08 | C25 | 0.00E+00 | C43 | 0.00E+00 | C61 | 0.00E+00 |
| | C8 | -5.18E-06 | C26 | 0.00E+00 | C44 | 0.00E+00 | C62 | 0.00E+00 |
| | C9 | 8.58E-07 | C27 | 0.00E+00 | C45 | 0.00E+00 | C63 | 0.00E+00 |
| | C10 | -2.44E-06 | C28 | 0.00E+00 | C46 | 0.00E+00 | C64 | 0.00E+00 |
| | C11 | -7.28E-08 | C29 | 0.00E+00 | C47 | 0.00E+00 | C65 | 0.00E+00 |
| | C12 | 1.77E-08 | C30 | 0.00E+00 | C48 | 0.00E+00 | C66 | 0.00E+00 |
| | C13 | -1.09E-07 | C31 | 0.00E+00 | C49 | 0.00E+00 | | |
| | C14 | 1.09E-08 | C32 | 0.00E+00 | C50 | 0.00E+00 | | |
| | C15 | -4.83E-08 | C33 | 0.00E+00 | C51 | 0.00E+00 | | |
| | C16 | 0.00E+00 | C34 | 0.00E+00 | C52 | 0.00E+00 | | |
| | C17 | 0.00E+00 | C35 | 0.00E+00 | C53 | 0.00E+00 | | |
| | C18 | 0.00E+00 | C36 | 0.00E+00 | C54 | 0.00E+00 | | |

FIG. 13

| SURFACE NUMBER | POLYNOMIAL COEFFICIENT | | | | | | | |
|---|---|---|---|---|---|---|---|---|
| 4 | C1 | 0.00E+00 | C19 | -2.13E-09 | C37 | 0.00E+00 | C55 | 0.00E+00 |
| | C2 | 0.00E+00 | C20 | -1.37E-09 | C38 | 0.00E+00 | C56 | 0.00E+00 |
| | C3 | 0.00E+00 | C21 | 1.86E-09 | C39 | 0.00E+00 | C57 | 0.00E+00 |
| | C4 | 1.54E-03 | C22 | 0.00E+00 | C40 | 0.00E+00 | C58 | 0.00E+00 |
| | C5 | 1.71E-04 | C23 | 0.00E+00 | C41 | 0.00E+00 | C59 | 0.00E+00 |
| | C6 | 1.32E-03 | C24 | 0.00E+00 | C42 | 0.00E+00 | C60 | 0.00E+00 |
| | C7 | 2.22E-06 | C25 | 0.00E+00 | C43 | 0.00E+00 | C61 | 0.00E+00 |
| | C8 | -1.11E-05 | C26 | 0.00E+00 | C44 | 0.00E+00 | C62 | 0.00E+00 |
| | C9 | 3.30E-06 | C27 | 0.00E+00 | C45 | 0.00E+00 | C63 | 0.00E+00 |
| | C10 | -2.59E-05 | C28 | 0.00E+00 | C46 | 0.00E+00 | C64 | 0.00E+00 |
| | C11 | 4.16E-08 | C29 | 0.00E+00 | C47 | 0.00E+00 | C65 | 0.00E+00 |
| | C12 | -4.41E-08 | C30 | 0.00E+00 | C48 | 0.00E+00 | C66 | 0.00E+00 |
| | C13 | 1.92E-07 | C31 | 0.00E+00 | C49 | 0.00E+00 | | |
| | C14 | -1.63E-08 | C32 | 0.00E+00 | C50 | 0.00E+00 | | |
| | C15 | 2.73E-07 | C33 | 0.00E+00 | C51 | 0.00E+00 | | |
| | C16 | -6.75E-11 | C34 | 0.00E+00 | C52 | 0.00E+00 | | |
| | C17 | -3.46E-10 | C35 | 0.00E+00 | C53 | 0.00E+00 | | |
| | C18 | 1.17E-09 | C36 | 0.00E+00 | C54 | 0.00E+00 | | |
| 5 | C1 | 0.00E+00 | C19 | 1.67E-12 | C37 | 0.00E+00 | C55 | 0.00E+00 |
| | C2 | 0.00E+00 | C20 | 8.55E-12 | C38 | 0.00E+00 | C56 | 0.00E+00 |
| | C3 | 0.00E+00 | C21 | 1.60E-11 | C39 | 0.00E+00 | C57 | 0.00E+00 |
| | C4 | 8.64E-04 | C22 | 0.00E+00 | C40 | 0.00E+00 | C58 | 0.00E+00 |
| | C5 | 3.56E-05 | C23 | 0.00E+00 | C41 | 0.00E+00 | C59 | 0.00E+00 |
| | C6 | 6.51E-04 | C24 | 0.00E+00 | C42 | 0.00E+00 | C60 | 0.00E+00 |
| | C7 | 7.33E-08 | C25 | 0.00E+00 | C43 | 0.00E+00 | C61 | 0.00E+00 |
| | C8 | -9.86E-07 | C26 | 0.00E+00 | C44 | 0.00E+00 | C62 | 0.00E+00 |
| | C9 | 7.08E-08 | C27 | 0.00E+00 | C45 | 0.00E+00 | C63 | 0.00E+00 |
| | C10 | -1.02E-06 | C28 | 0.00E+00 | C46 | 0.00E+00 | C64 | 0.00E+00 |
| | C11 | 1.19E-09 | C29 | 0.00E+00 | C47 | 0.00E+00 | C65 | 0.00E+00 |
| | C12 | -2.66E-10 | C30 | 0.00E+00 | C48 | 0.00E+00 | C66 | 0.00E+00 |
| | C13 | 1.12E-09 | C31 | 0.00E+00 | C49 | 0.00E+00 | | |
| | C14 | -6.46E-10 | C32 | 0.00E+00 | C50 | 0.00E+00 | | |
| | C15 | -1.75E-09 | C33 | 0.00E+00 | C51 | 0.00E+00 | | |
| | C16 | -2.76E-13 | C34 | 0.00E+00 | C52 | 0.00E+00 | | |
| | C17 | -4.54E-13 | C35 | 0.00E+00 | C53 | 0.00E+00 | | |
| | C18 | 2.76E-12 | C36 | 0.00E+00 | C54 | 0.00E+00 | | |

FIG. 14

| SURFACE NUMBER | POLYNOMIAL COEFFICIENT | | | | | | | | | |
|---|---|---|---|---|---|---|---|---|---|---|
| 6 | C1 | 0.00E+00 | C19 | 1.51E-12 | C37 | 1.80E-21 | C55 | 0.00E+00 |
| | C2 | 1.93E-01 | C20 | 6.21E-12 | C38 | 1.60E-21 | C56 | 0.00E+00 |
| | C3 | 1.76E+00 | C21 | 1.00E-11 | C39 | -1.24E-20 | C57 | 0.00E+00 |
| | C4 | 8.25E-04 | C22 | 4.27E-15 | C40 | 7.84E-21 | C58 | 0.00E+00 |
| | C5 | -8.58E-06 | C23 | -3.90E-15 | C41 | -2.19E-20 | C59 | 0.00E+00 |
| | C6 | 3.26E-04 | C24 | 5.78E-15 | C42 | -5.71E-20 | C60 | 0.00E+00 |
| | C7 | 5.36E-08 | C25 | -1.46E-14 | C43 | 5.62E-20 | C61 | 0.00E+00 |
| | C8 | 5.80E-08 | C26 | 6.04E-15 | C44 | 8.07E-23 | C62 | 0.00E+00 |
| | C9 | 1.49E-07 | C27 | 4.91E-15 | C45 | -3.96E-21 | C63 | 0.00E+00 |
| | C10 | 1.14E-06 | C28 | -2.71E-14 | C46 | 0.00E+00 | C64 | 0.00E+00 |
| | C11 | 1.46E-09 | C29 | -1.11E-18 | C47 | 0.00E+00 | C65 | 0.00E+00 |
| | C12 | 1.16E-11 | C30 | 4.43E-18 | C48 | 0.00E+00 | C66 | 0.00E+00 |
| | C13 | 2.54E-09 | C31 | 3.85E-17 | C49 | 0.00E+00 | | |
| | C14 | -8.85E-10 | C32 | 9.94E-17 | C50 | 0.00E+00 | | |
| | C15 | -9.76E-10 | C33 | 2.29E-17 | C51 | 0.00E+00 | | |
| | C16 | 8.38E-14 | C34 | -5.39E-17 | C52 | 0.00E+00 | | |
| | C17 | -6.97E-14 | C35 | -4.83E-17 | C53 | 0.00E+00 | | |
| | C18 | 3.71E-13 | C36 | 3.04E-17 | C54 | 0.00E+00 | | |

FIG. 15

|  |  | EXAMPLE 1 | EXAMPLE 2 |
|---|---|---|---|
| VIRTUAL IMAGE SIZE | X | 6000.0 | 6000.0 |
|  | Y | 2250.0 | 2250.0 |
| VIEWER-VIRTUAL IMAGE DISTANCE |  | 30000.0 | 30000.0 |

HEAD-UP DISPLAY AND MOVING BODY EQUIPPED WITH HEAD-UP DISPLAY

CROSS-REFERENCE TO RELATED APPLICATIONS

This application is a continuation-in-part of the PCT International Application No. PCT/JP2016/003029 filed on Jun. 23, 2016, which claims the benefit of foreign priority of Japanese patent application No. 2015-128943 filed on Jun. 26, 2015, the contents all of which are incorporated herein by reference.

BACKGROUND

1. Technical Field

The present disclosure relates to a head-up display that projects an image on a transmissive-type reflection member to allow a viewer to visually observe a virtual image.

2. Description of the Related Art

Japanese Patent Unexamined Publication No. 2008-180759 discloses a display apparatus that enables stereoscopic display. This display apparatus includes a display panel, an imaging optical system, and an imaging-position changing unit. The display panel is an image production unit for producing an image. The imaging optical system provides the image produced by the image production unit. The imaging-position changing unit is provided at the incident side of the imaging optical system. The imaging-position changing unit changes the position of the image provided by the imaging optical system. The imaging-position changing unit includes a relay optical system that forms an intermediate image between the image production unit and the imaging optical system. The relay optical system changes the position of the intermediate image, thereby changing the respective positions of a plurality of images that are successively displayed by the image production unit.

SUMMARY

A head-up display according to the present disclosure projects an image on a transmissive reflection member to allow a viewer to visually observe a virtual image. The head-up display includes a display device, a relay optical system, and a projection optical system. The display device displays an image. The relay optical system includes a first relay mirror having a concave reflection surface, and provides the image displayed by the display device as an intermediate image. The projection optical system includes a first projection mirror having a concave reflection surface, and reflects the intermediate image provided by the relay optical system to project the intermediate image on the reflection member.

While small in size, the head-up display according to the present disclosure is capable of presenting a large-sized virtual image.

BRIEF DESCRIPTION OF DRAWINGS

FIG. 5 is a table showing eccentricity data of various surfaces in an optical system of example 1, which corresponds to the first exemplary embodiment.

FIG. 6 is a table showing radius of curvature of the various surfaces in the optical system of example 1, which corresponds to the first exemplary embodiment.

FIG. 7 is a table showing freeform surface shape data in the optical system of example 1, which corresponds to the first exemplary embodiment.

FIG. 8 is a table showing freeform surface shape data in the optical system of example 1, which corresponds to the first exemplary embodiment.

FIG. 9 is a table showing freeform surface shape data in the optical system of example 1, which corresponds to the first exemplary embodiment.

FIG. 10 is a table showing eccentricity data of various surfaces in an optical system of example 2, which corresponds to the first exemplary embodiment.

FIG. 11 is a table showing radius of curvature of the various surfaces in the optical system of example 2, which corresponds to the first exemplary embodiment.

FIG. 12 is a table showing freeform surface shape data in the optical system of example 2, which corresponds to the first exemplary embodiment.

FIG. 13 is a table showing freeform surface shape data in the optical system of example 2, which corresponds to the first exemplary embodiment.

FIG. 14 is a table showing freeform surface shape data in the optical system of example 2, which corresponds to the first exemplary embodiment.

FIG. 15 is a table showing data of head-up displays of examples 1 and 2.

DETAILED DESCRIPTION OF PREFERRED EMBODIMENTS

Hereinafter, exemplary embodiments will be described in detail with reference to the drawings. However, unnecessarily detailed description may be omitted. For example, detailed description of well-known matters and repetitive description of substantially the same structures may be omitted. This is to prevent the following description from becoming redundant and to facilitate understanding for those skilled in the art.

It should be noted that the appended drawings and the following description are provided for those skilled in the art to sufficiently understand the present disclosure, and they are not intended to limit the subject matter set forth in the claims.

First Exemplary Embodiment

Hereinafter, a first exemplary embodiment will be described with reference to FIGS. 1 to 4.

1-1. Configuration
1-1-1. Overall Configuration of Head-Up Display

Specific exemplary embodiments and examples of head-up display 100 according to the present disclosure will be described below with reference to the drawings.

Figure 1:
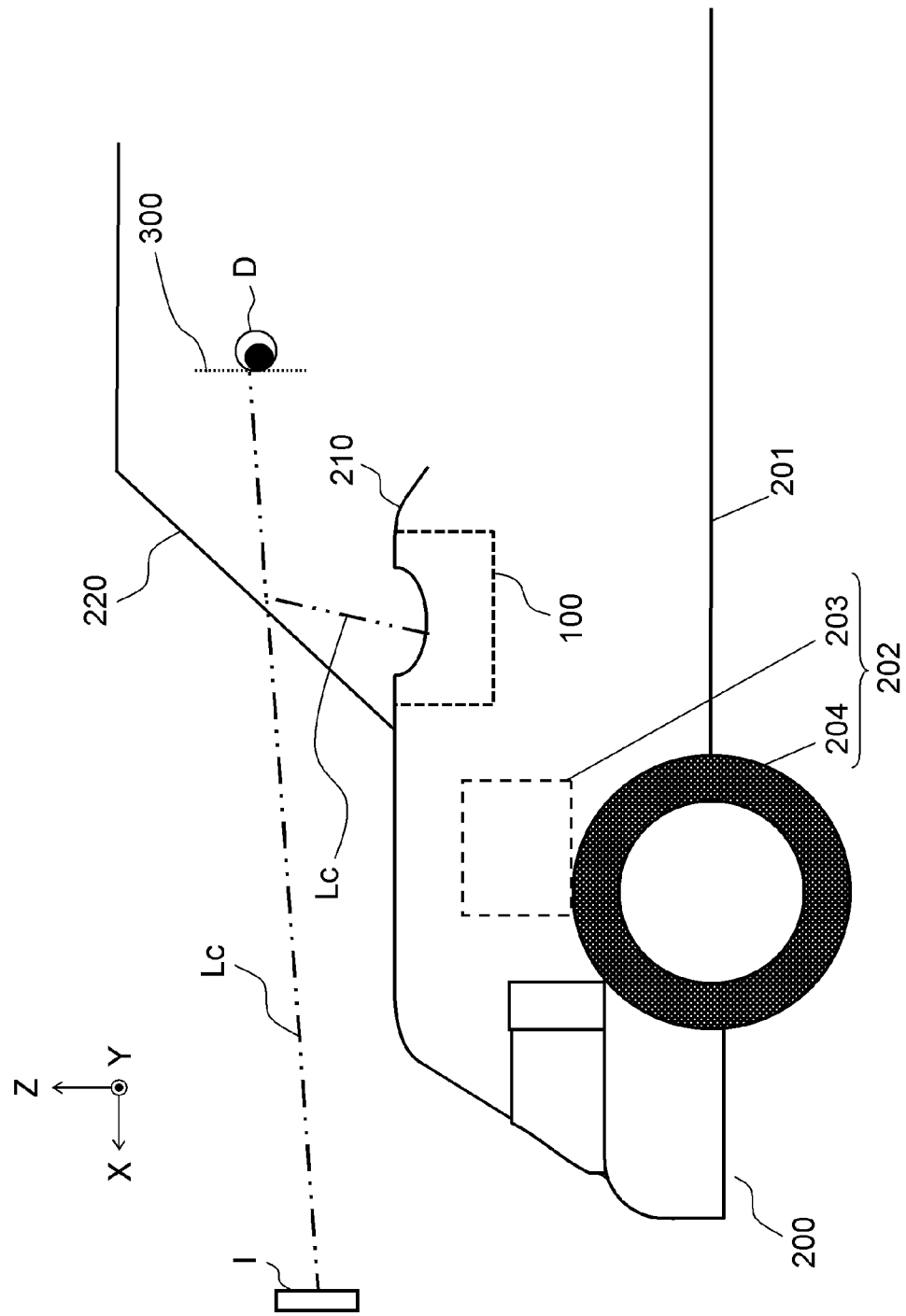
FIG. 1 is a schematic view illustrating a moving body equipped with a head-up display according to the present disclosure.

FIG. 1 is a schematic view illustrating a cross section of vehicle 200 equipped with head-up display 100 according to the present disclosure. Vehicle 200 includes main body 201, driving unit 202 configured to move main body 201, head-up display 100 mounted to main body 201, and windshield 220 fixed to main body 201. Driving unit 202 includes driving source 203 such as an engine and motor, and driving wheels 204 to be driven by driving source 203. Head-up display 100 is disposed inside dashboard 210, which is below windshield 220 of vehicle 200. Viewer D recognizes an image projected from head-up display 100 as virtual image I. Note that head-up display 100 can be mounted to any other moving bodies having a windshield, such as a motor bike, a boat and a plane.

Figure 2:
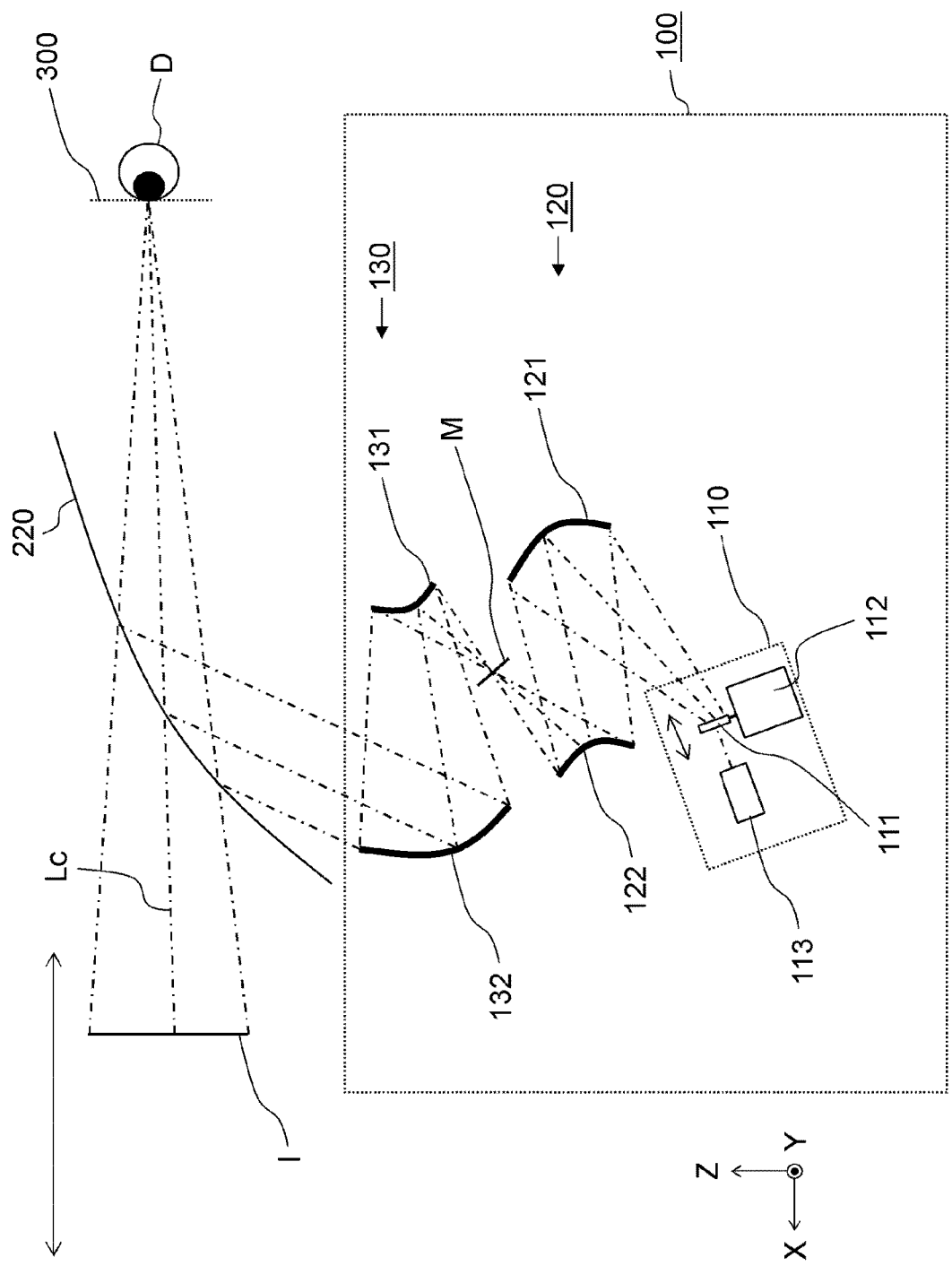
FIG. 2 is a schematic view showing an optical cross section illustrating a configuration of a head-up display according to a first exemplary embodiment.

FIG. 2 is a schematic view showing an optical cross section for illustrating head-up display 100 according to the first exemplary embodiment. As illustrated in FIG. 2, head-up display 100 includes display device 110, relay optical system 120, and projection optical system 130. Head-up display 100 causes the image displayed by display device 110 to be reflected by windshield 220 and guides the image to viewpoint region 300 (also referred to as an eyebox) for viewer D, to present virtual image I.

Herein, the optical path of the display image on screen 111 that forms the center of virtual image I is defined as reference light ray Lc. Reference light ray Lc visually observed by viewer D is actually one that has traveled from display device 110 through the optical systems to viewer D. Accordingly, the light ray from display device 110 to viewer D, which corresponds to reference light ray Lc emanating from the center of virtual image I, is also expressed as reference light ray Lc. Also, each of the optical paths that correspond to these light rays is also expressed as reference light ray Lc. It should be noted, however, that the viewpoint of viewer D is assumed to be at the center of viewpoint region 300.

Display device 110 includes screen 111, drive unit 112 for shifting screen 111, and scanning laser 113. In display device 110, display image information is controlled by a controller, such as a microcomputer, which is not shown in the drawings. Various information, such as route guidance display, distance to the vehicle ahead, remaining vehicle battery charge, and current vehicle speed, may be displayed as the display image information. A scanning laser or a projector that projects an image on screen 111 may be used as the light source of display device 110. Scanning laser 113 forms a display image by scanning the surface of screen 111. Drive unit 112 shifts screen 111 along reference light ray Lc. By shifting screen 111 along reference light ray Lc with drive unit 112, the distance from viewer D to virtual image I can be adjusted. For example, when screen 111 is shifted in a direction away from relay optical system 120, virtual image I can be placed away from viewer D.

In addition, drive unit 112 moves according to the scanning position of scanning laser 113 in screen 111. This enables virtual image I to be depicted on any plane, irrespective of the angle of emergence of reference light ray Lc from screen 111. For example, by synchronizing the scanning period of scanning laser 113 and the swing period of scanning laser 113 with each other, virtual image I can be depicted on a plane inclined with respect to viewer D. In addition, it is possible to stereoscopically display virtual image I by shifting screen 111 back and forth along reference light ray Lc at several tens of Hz.

Here, the amount of shift of intermediate image M is greater than the amount of shift of screen 111. The reason is that lateral magnification δ of relay optical system 120 has a magnifying effect greater than 1. Here, the amount of shift of intermediate image M is $\beta^2$ times the amount of shift of screen 111.

Note that drive unit 112 may be configured to rotate or tilt screen 111, not just to shift screen 111 along the optical axis.

Relay optical system 120 includes first mirror 121 and second mirror 122. First mirror 121 and second mirror 122 serve as a first relay mirror and a second relay mirror, respectively. Second mirror 122 is provided between first mirror 121 and projection optical system 130 along an optical path from display device 110 to windshield 220 as a reflection member. Relay optical system 120 forms intermediate image M by reflecting the image displayed on screen 111 of display device 110 by first mirror 121 and further reflecting it by second mirror 122. At that time, intermediate image M is formed so as to be enlarged from the image displayed on screen 111. In other words, even when the image displayed on screen 111 is small, large intermediate image M can be obtained. This enables screen 111 to have a reduced size. Moreover, because the size of intermediate image M is large, the magnifying power of projection optical system 130 can be reduced. As a result, the positive power of fourth mirror 132 of projection optical system 130 can be reduced, so that image distortion can be prevented. Specifically, it is desirable that the power of relay optical system 120 be set so as to satisfy the following condition (1).

$$1.4 < \beta < 4.0 \quad (1)$$

Here, δ is the lateral magnification of relay optical system 120.

Note that intermediate image M does not need to be imaged as a good point at the intermediate image position, and it is acceptable that spherical aberration, comatic aberration, field curvature, and astigmatism may occur.

Projection optical system 130 includes third mirror 131 and fourth mirror 132. Projection optical system 130 reflects intermediate image M, which is formed by relay optical system 120, by third mirror 131 and further by fourth mirror 132, thereby projecting intermediate image M on windshield 220. Note that intermediate image M is provided in the air, not on a projection plane which diffuses and reflects light. Fourth mirror 132 and third mirror 131 serve as a first projection mirror and a second projection mirror, respectively. Third mirror 131 is provided between relay optical system 120 and fourth mirror 132 along the optical path from display device 110 to windshield 220.

1-1-2. Arrangement of Projection Optical System, Relay Optical System, and Display Device In head-up display 100 according to the first exemplary embodiment, display device 110 is disposed below relay optical system 120 and projection optical system 130. In addition, the display surface of screen 111 of display device 110 faces toward first mirror 121. It is desirable that reference light ray Lc emanating from display device 110 is inclined with respect to the display surface of screen 111. Thereby, it is possible to prevent stray light from occurring. The stray light may result from the ambient light that enters the housing and is reflected on the display surface of display device 110. Screen 111 of display device 110 is composed of an optical member having diffusion characteristics. Also, scanning laser 113 for projecting images on screen 111 is disposed behind screen 111.

As illustrated in FIG. 2, first mirror 121 is disposed above display device 110 and closer to viewer D than display device 110 is. The reflection surface of first mirror 121 is decentered so as to reflect the image displayed by display device 110 in a direction such that it is projected on second mirror 122. Second mirror 122 is disposed below first mirror 121 and closer to virtual image I than first mirror 121 is. The reflection surface of second mirror 122 is decentered so as to reflect the light ray reflected by first mirror 121 in a direction such that it is projected on third mirror 131.

Third mirror 131 is disposed above first mirror 121. The reflection surface of third mirror 131 is decentered so as to reflect the light ray reflected by second mirror 122 in a direction such that it is projected on fourth mirror 132. Fourth mirror 132 is disposed closer to virtual image I than third mirror 131 is. The reflection surface of fourth mirror 132 is decentered so as to reflect the reflected light from third mirror 131 in a direction such that it is projected on windshield 220.

Here, the gap from first mirror 121 to second mirror 122 along reference light ray Lc is smaller than the gap from third mirror 131 to fourth mirror 132 along reference light ray Lc. This enables the size of head-up display 100 to be smaller. In addition, the gap from screen 111 to first mirror 121 along reference light ray Lc is smaller than the gap from first mirror 121 to intermediate image M along reference light ray Lc. This makes it possible to achieve a size reduction of first mirror 121 and also reduce the size of head-up display 100. The upper end of the reflection surface of first mirror 121 is positioned vertically above the lower end of the reflection surface of fourth mirror 132. This makes it possible to reduce the size of head-up display 100.

Moreover, when the position of the exit pupil of relay optical system 120 is brought closer to projection optical system 130, variations in the output angle from screen 111 can be reduced over the area extending from the central portion of the display image area of screen 111 to the peripheral portion thereof. This reduces distortion fluctuations when screen 111 is moved along the direction of reference light ray Lc.

In relay optical system 120 of the first exemplary embodiment, the reflection surface of first mirror 121 has a concave shape. On the other hand, the reflection surface of second mirror 122 has a convex shape. Second mirror 122 in a convex shape makes it possible to correct asymmetrical eccentric aberration caused by first mirror 121 in a desirable manner. In addition, first mirror 121 in a concave shape can serve the focusing effect of intermediately providing the image on screen 111. However, it is also possible that either one of first mirror 121 or second mirror 122 may have a freeform surface and the other one may be a planar mirror. In addition, relay optical system 120 is not limited to having the two mirrors, first mirror 121 and second mirror 122. Relay optical system 120 may be composed of a refractive optical element such as a lens element that has a similar function, or may be composed of first mirror 121 only.

In projection optical system 130 of the first exemplary embodiment, the reflection surface of third mirror 131 has a convex shape. On the other hand, the reflection surface of fourth mirror 132 has a concave shape. Third mirror 131 in a convex shape makes it possible to correct asymmetrical eccentric aberration that is caused by fourth mirror 132 in a desirable manner. In addition, fourth mirror 132 in a concave shape allows viewer D to visually observe virtual image I that is enlarged from intermediate image M.

Here, the power of first mirror 121 is the highest in relay optical system 120 and projection optical system 130. This achieves a size reduction of relay optical system 120.

In the present exemplary embodiment, first mirror 121, second mirror 122, third mirror 131, and fourth mirror 132 adopt a freeform surface shape. The reason is that the distortion in the virtual image caused by reflection should be corrected so that good virtual image I can be viewed over the entire area of viewpoint region 300.

1-2. Advantageous Effects, Etc.

In the present exemplary embodiment, head-up display 100 includes display device 110, relay optical system 120, and projection optical system 130, as described above. The image provided by relay optical system 120 is larger than the display image displayed on screen 111 by display device 110. This achieves a size reduction of display device 110. Moreover, relay optical system 120 serves to reduce the positive power of projection optical system 130 while at the same time correcting image distortion in a desirable manner and reducing the size of screen 111.

Second Exemplary Embodiment

Hereinafter, a second exemplary embodiment will be described with reference to FIG. 3. In the present exemplary embodiment, the configuration of relay optical system 140 is different from that of relay optical system 120 of the first exemplary embodiment, and the rest of the configuration is the same as that of the first exemplary embodiment. For this reason, the description will primarily be made on the different points, and the description of the same or similar configurations will be omitted.

2-1. Configuration 2-1-1. Overall Configuration of Head-Up Display

Figure 3:
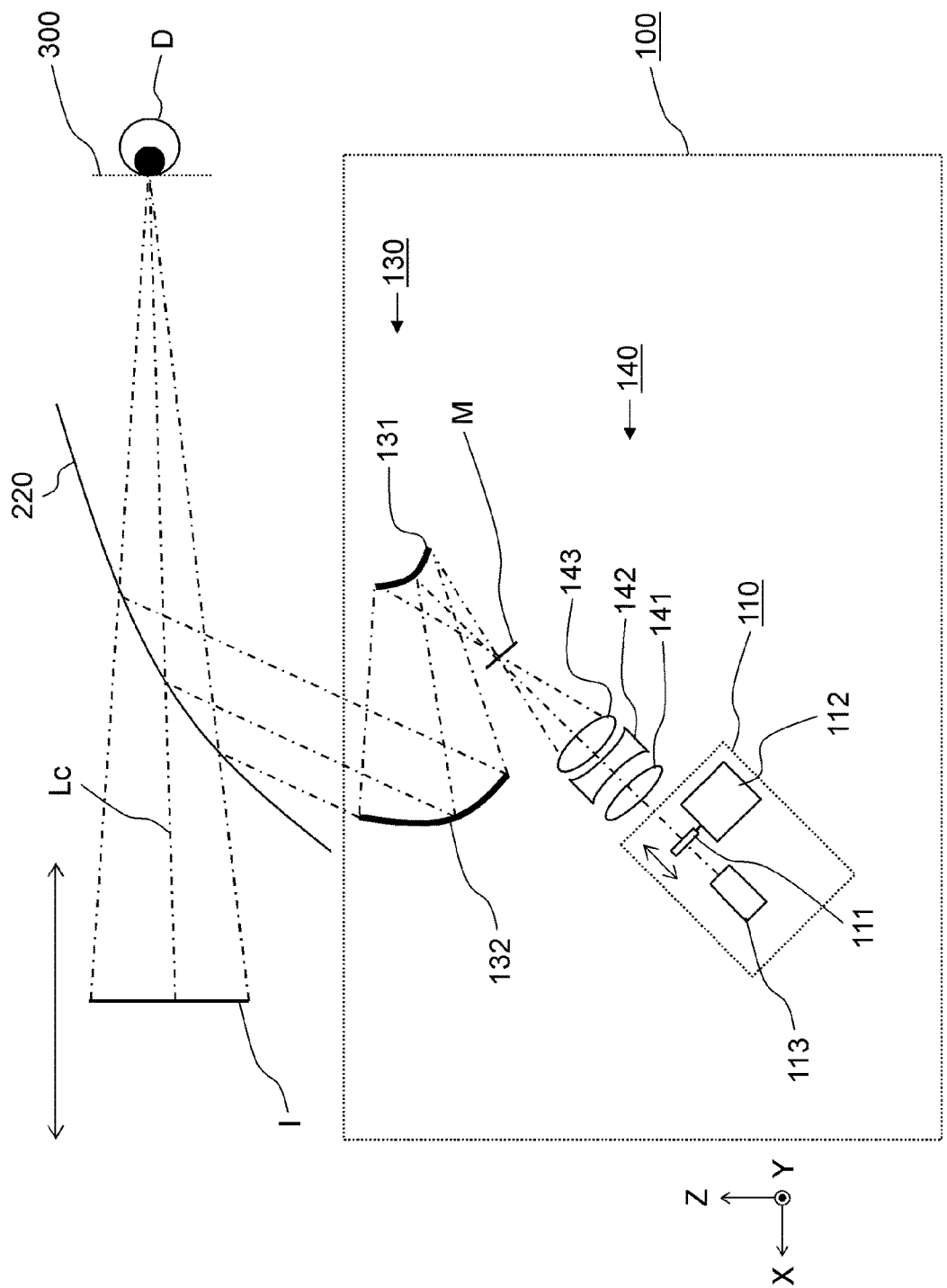
FIG. 3 is a schematic view showing an optical cross section illustrating a configuration of a head-up display according to a second exemplary embodiment.

FIG. 3 is a schematic view showing an optical cross section for illustrating head-up display 100 according to the second exemplary embodiment.

Relay optical system 140 in the second exemplary embodiment includes first lens 141, second lens 142, and third lens 143. Relay optical system 140 as a whole has a positive power. First lens 141 is in a spherical shape having a positive power. Second lens 142 is in a spherical shape having a negative power. Third lens 143 is in a spherical shape having a positive power. However, it is also possible that the surface shape of any of first lens 141, second lens 142, or third lens 143 may be in a freeform surface shape. In addition, relay optical system 140 is not limited to having three lenses, first lens 141, second lens 142, and third lens 143, and may be composed of four or more lenses.

The image displayed on screen 111 of display device 110 is refracted by first lens 141, then refracted by second lens 142, and then refracted by third lens 143, to form intermediate image M. Intermediate image M is formed so as to be enlarged from the image displayed on screen 111. Specifically, the power of relay optical system 140 is set so as to satisfy the following condition (1).

$$1.4 < \beta < 4.0 \qquad (1)$$

Here, δ is the lateral magnification of relay optical system 140.

Projection optical system 130 includes third mirror 131 and fourth mirror 132. Projection optical system 130 reflects intermediate image M, which is formed by relay optical system 140, by third mirror 131 and further by fourth mirror 132, thereby projecting intermediate image M on windshield 220.

2-1-2. Arrangement of Projection Optical System, Relay Optical System, and Display Device In head-up display 100 according to the second exemplary embodiment, display device 110 is disposed below relay optical system 140 and projection optical system 130. In addition, the display surface of screen 111 of display device 110 faces toward first lens 141. In this arrangement, it is desirable that reference light ray Lc emanating from display device 110 is inclined with respect to the display surface of screen 111. Thereby, it is possible to prevent stray light from occurring. The stray light may result from the ambient light, such as sunlight, that enters the housing of head-up display 100 and is reflected on the display surface of screen 111. Screen 111 of display device 110 is composed of an optical member having diffusion characteristics. Also, scanning laser 113 for projecting images on screen 111 is disposed behind screen 111.

Third mirror 131 is disposed above relay optical system 140. The reflection surface of third mirror 131 is decentered so as to reflect the light ray emanating from third lens 143 in a direction such that it is projected on fourth mirror 132. Fourth mirror 132 is disposed closer to virtual image I than third mirror 131 is (in the positive direction of the X axis). The reflection surface of fourth mirror 132 is decentered so as to project the reflected light from third mirror 131 in a direction such that it is projected on windshield 220.

2-2. Advantageous Effects, Etc.

In the present exemplary embodiment, head-up display 100 includes display device 110, relay optical system 140, and projection optical system 130, as described above. The image provided by relay optical system 140 is larger than the display image displayed on screen 111 by display device 110. This achieves a size reduction of display device 110. Moreover, relay optical system 140 serves to reduce the positive power of projection optical system 130 while at the same time correcting image distortion in a desirable manner and reducing the size of screen 111.

The second exemplary embodiment has described that, as an example, relay optical system 140 includes three lens elements, positive power first lens 141, negative power second lens 142, and positive power third lens 143. However, as long as relay optical system 140 as a whole has a positive power, relay optical system 140 is not limited to this structure. For this reason, it is possible to replace a portion of relay optical system 140 of the second exemplary embodiment with such relay optical system 140 in the first exemplary embodiment.

For example, in place of negative power second lens 142, it is possible to adopt a convex mirror. Also, in place of positive power third lens 143, it is possible to adopt a concave mirror. In this case, the relay optical system has first lens 141, the concave mirror, and the convex mirror arranged in this order from the display device to intermediate image M. In addition, as long as the shape of first lens 141 is such that first lens 141 has a positive power, and the shape is not limited to a spherical shape or an aspherical shape. For example, a freeform surface shape having a plurality of focal lengths in one lens may be applied to first lens 141. In this case, first lens 141 is disposed so as to be inclined with respect to reference light ray Lc. More specifically, the tangent plane that is tangent (contacts) to the exit surface of the first lens 141 at the point through which reference light ray Lc passes is not orthogonal to reference light ray Lc. Furthermore, it is desirable that the tangent plane be inclined with respect to reference light ray Lc so as to face a downward area of the adjacent concave mirror. Thereby, it is possible to prevent stray light from occurring. The stray light may result from the ambient light that enters the housing and is reflected on the incident surface or the exit surface of first lens 141. Moreover, due to the fact that the tangent plane to the exit surface of first lens 141 is inclined toward a downward area of the adjacent concave mirror, stray light does not occur because the ambient light does not enter the adjacent concave mirror or other mirrors even when the ambient light enters first lens 141.

Meanwhile, it is desirable that the optical members in relay optical system 140 be disposed so as to satisfy the following condition (2).

$$2 < A/B < 200 \tag{2}$$

Here, A is the optical path length of reference light ray Lc from the exit surface of first lens 141 to the adjacent concave mirror, and B is the optical path length of reference light ray Lc from screen 111 of display device 110 to the incident surface of first lens 141.

Condition (2) defines the positional relationship between screen 111 of display device 110, first lens 141, and the concave mirror adjacent to first lens 141. Satisfying this condition makes it possible to reduce the size of relay optical system 140. If the value of A/B exceeds the upper limit of condition (2), the concave mirror adjacent to first lens 141 is excessively distant from screen 111 so that the concave mirror needs to be large in size and consequently the size of head-up display 100 becomes undesirably large. On the other hand, if the value of A/B is smaller than the lower limit of condition (2), first lens 141 is excessively distant from screen 111 so that first lens 141 needs to be large in size and consequently it becomes difficult to provide small-sized head-up display 100.

In addition, the foregoing advantageous effects may be enhanced by satisfying the following condition (2)'.

$$4 < A/B < 75 \tag{2}'$$

Furthermore, the foregoing advantageous effects may be enhanced by further satisfying the following condition (2)".

$$5 < A/B < 50 \tag{2}''$$

Moreover, it is desirable that the angle formed by reference light ray Lc and the light ray emanating from screen 111, among the light rays reaching the center of viewpoint region 300, should satisfy the following condition (3).

$$\theta\ max < 5 \tag{3}$$

Here, θ max is the maximum value of the angle [deg] formed by the reference light ray and the main light ray reaching the center of the viewpoint region from the display surface.

Condition (3) defines the light rays emanating from screen 111 when viewer D observes virtual image I from the center of viewpoint region 300. That is, when reference light ray Lc and main light ray L that reaches the center point of the viewpoint region satisfy this condition, viewer D can visually observe good virtual image I with small shape fluctuations.

In addition, the foregoing advantageous effects may be enhanced by satisfying the following condition (3)'.

$$\theta\ max < 2 \tag{3}'$$

Furthermore, the foregoing advantageous effects may be enhanced by further satisfying the following condition (3)".

$$\theta\ max < 1 \tag{3}''$$

The power of first lens 141 is lower than the power of the adjacent concave mirror. This can reduce the power of first lens 141 and reduce the chromatic aberration produced by first lens 141.

Third Exemplary Embodiment

Figure 4:
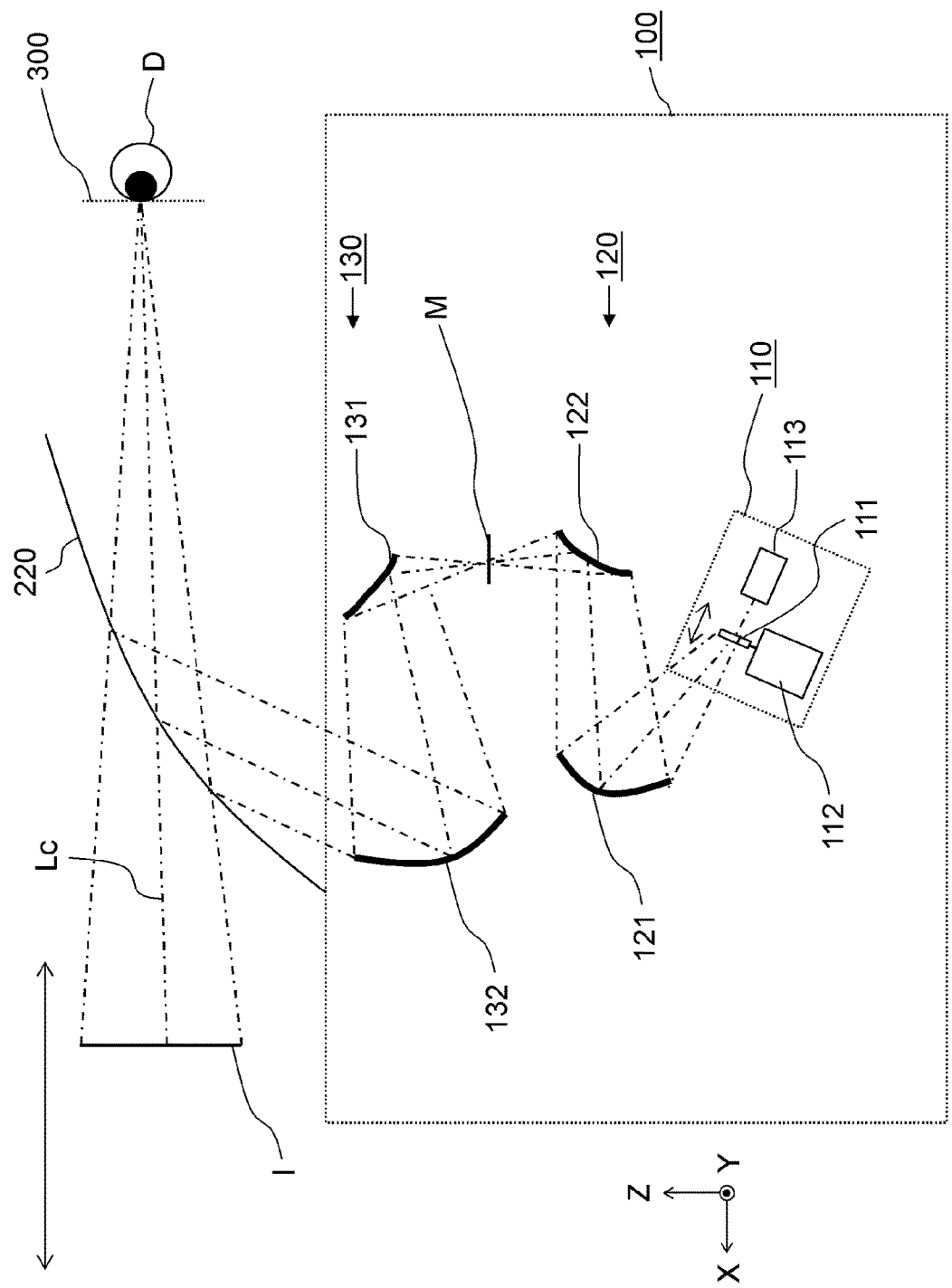
FIG. 4 is a schematic view showing an optical cross section illustrating a configuration of a head-up display according to a third exemplary embodiment.

Hereinafter, a third exemplary embodiment will be described with reference to FIG. 4. In the present exemplary embodiment, the arrangement position of relay optical system 120 is different from that in the first exemplary embodiment, and the rest of the configuration is the same as that of the first exemplary embodiment. For this reason, the description will primarily be made on the different points, and the description of the same or similar configurations will be omitted.

3-1. Configuration 3-1-1. Arrangement of Projection Optical System, Relay Optical System, and Display Device In head-up display 100 according to the third exemplary embodiment, display device 110 is disposed below relay optical system 120 and projection optical system 130. In addition, the display surface of screen 111 of display device 110 faces toward first mirror 121. In this arrangement, it is desirable that reference light ray Lc emanating from display device 110 is inclined with respect to the display surface of screen 111. Thereby, it is possible to prevent stray light from occurring. The stray light may result from the ambient light, such as sunlight, that enters the housing of head-up display 100 and is reflected on the display surface of screen 111. Screen 111 is composed of an optical member having diffusion characteristics. Also, scanning laser 113 for projecting images on screen 111 is disposed behind screen 111.

First mirror 121 is disposed above display device 110 along the vertical direction of vehicle 200 (in the positive direction of the Z axis) and closer to virtual image I (in the positive direction of the X axis) than display device 110 is, and the reflection surface thereof is decentered so as to project the image displayed by display device 110 in a direction such that it is projected on second mirror 122. Second mirror 122 is disposed above first mirror 121 and closer to viewer D (in the negative direction of the X axis) than first mirror 121 is, and the reflection surface thereof is decentered so as to project the light rays reflected by first mirror 121 in a direction such that they are projected on third mirror 131.

Here, the gap between first mirror 121 and second mirror 122 along reference light ray Lc is smaller than the gap between third mirror 131 to fourth mirror 132 along reference light ray Lc. This enables the size of head-up display 100 to be smaller. In addition, the gap from screen 111 to first mirror 121 along reference light ray Lc is smaller than the gap from first mirror 121 to intermediate image M along reference light ray Lc. This makes it possible to achieve a size reduction of first mirror 121 and also reduce the size of head-up display 100. In addition, the exit side of screen 111 faces in a traveling direction of vehicle 200. This allows scanning laser 113 to be disposed closer to viewer D than screen 111 is, so as to avoid interference with the structural elements in a front portion of the vehicle.

Other Exemplary Embodiments

Hereinabove, the first to third second exemplary embodiments have been described as examples of the technology of the present disclosure. However, the technology of the present disclosure is not limited thereto and may be appropriately applied to other embodiments in which modifications, substitutions, additions, and subtractions are made. It is also possible to construct other embodiments by combining various component parts described in the first to third exemplary embodiments.

The first to third exemplary embodiments have described that display device 110 uses a scanning laser or a projector that projects an image on screen 111. However, it is also possible to equip a liquid crystal display device, an organic electroluminescent device, a plasma display device, and the like, as screen 111, without using the projector or the scanning laser. Drive unit 112 is a driving device for shifting screen 111 along reference light ray Lc.

In the first to third exemplary embodiments, either one of third mirror 131 or fourth mirror 132 may have a freeform surface and the other one may be a planar mirror. In addition, projection optical system 130 is not limited to having the two mirrors, third mirror 131 and fourth mirror 132. Projection optical system 130 may be composed with a refractive optical element such as a lens element that has a similar function, or may be composed of fourth mirror 132 only.

In the first to third exemplary embodiments, it has been described that third mirror 131 employs a mirror having a rotationally asymmetrical shape. However, third mirror 131 may have a so-called saddle-like surface shape, which has different signs of curvature for the X axis and the Y axis.

In the first and third exemplary embodiments, it has been described that second mirror 122 employs a mirror having a rotationally asymmetrical shape. However, second mirror 122 may have a so-called saddle-like surface shape, which has different signs of curvature for the X axis and the Y axis.

The first to third exemplary embodiments have described using an example in which screen 111 includes only one screen, but this is merely illustrative. That is, each of the head-up displays may include a plurality of screens 111. In this case, the plurality of screens 111 may be disposed at different positions with respect to scanning laser 113. On the optical path from one of the plurality of screens 111 that is disposed away from scanning laser 113 to scanning laser 113, an optical element for correcting optical path length is disposed. This optical element has a refractive index higher than the air and substantially does not have refractive power. On the other hand, on the optical path from one of the plurality of screens 111 that is disposed near scanning laser 113 to scanning laser 113, a positive power lens element is disposed.

This configuration enables a plurality of virtual images I to be displayed, and also makes it possible to differ the display distances for the plurality of virtual images I to viewer D.

It will be appreciated that the foregoing exemplary embodiments merely illustrate the technology of the present disclosure, and therefore, various modifications, substitutions, additions, and subtractions may be made within the scope of the claims and equivalents thereof.

Numerical Examples

In the following, numerical examples corresponding to the first exemplary embodiments will be shown with reference to FIGS. 5 to 15.

Hereinafter, specific examples of the display device according to the present technology will be described. In the examples described below, the unit of length in the tables is millimeter (mm), and the unit of angle in the tables is degree. Also, the freeform surface is defined by the following equation.

$$z = \frac{cr^2}{1 + \sqrt{1 - (1+k)c^2 r^2}} + \sum_{m,n} C_j x^m y^n \quad (m \geq 0, n \geq 0, m+n > 0)$$

-continued $$j = \frac{(m+n)^2 + m + 3n}{2} + 1$$

In the equation, z is the sag at the position (x, y) from the axis defining a surface. Therein, r is the radius of curvature at the origin of the axis defining the surface. Therein, c is the curvature at the origin of the axis defining the surface. Therein, k is the conic constant, which corresponds to Cl of the polynomial coefficients. Therein, Cj is the coefficient of the monomial $x^m y^n$. Note that m and n are integers equal to or greater than 0.

In each of the examples, the coordinate origin that serves as the reference is the center of the image (display surface) displayed on display device 110. In the tables, the horizontal axis of the display surface is represented as the X axis, the vertical axis thereof is represented as the Y axis, and the axis orthogonal to the display surface is represented as the Z axis.

In the eccentricity data, ADE means the amount by which a mirror or a lens is rotated from the Z axis toward the Y axis about the X axis. BDE means the amount by which a mirror or a lens is rotated from the X axis toward the Z axis about the Y axis. CDE means the amount by which a mirror or a lens is rotated from the X axis toward the Y axis about the Z axis.

Numerical Example 1

FIGS. 5 to 9 show data of the optical system of head-up display 100 of numerical example 1 (first exemplary embodiment). Numerical example 1 adopts the configuration of the first exemplary embodiment. Specific data of the optical system are shown in FIGS. 5 to 9. FIG. 5 shows eccentricity data of various surfaces in respective optical elements of head-up display 100. FIG. 6 shows radius of curvature of each of the surfaces. FIGS. 7 to 9 show polynomial coefficients representing the shapes of freeform surfaces.

Numerical Example 2

FIGS. 10 to 14 show data of the optical system of head-up display 100 of numerical example 2 (first exemplary embodiment). Numerical example 2 adopts the configuration of the first exemplary embodiment. Specific data of the optical system are shown in FIGS. 10 to 14. FIG. 10 shows eccentricity data of various surfaces in respective optical elements of head-up display 100. FIG. 11 shows radius of curvature. FIGS. 12 to 14 show polynomial coefficients representing the shapes of freeform surfaces.

FIG. 15 shows data indicating the size of virtual image I and the distance from viewer D to virtual image I for examples 1 and 2.

Table 1 shows the corresponding values of conditional expression (1) to Examples 1 and 2.

TABLE 1

|  | Example 1 | Example 2 |
|---|---|---|
| Conditional expression (1) | 1.73 | 2.29 |

As described above, the present disclosure is applicable to a head-up display that projects images on a reflective transmission member. Specifically, the present disclosure is applicable to, for example, a head-up display that is incorporated in a moving body having a windshield.

What is claimed is:

1. A head-up display configured to project an image on a transmissive reflection member to allow an observer to visually observe the image as a virtual image, the head-up display comprising:
   a display configured to display an image;
   a relay optical system including a first relay mirror having a concave reflection surface and a second relay mirror having a convex reflection surface, and configured to provide the image displayed by the display as an intermediate image; and
   a projection optical system including a first projection mirror having a concave reflection surface, and configured to reflect the intermediate image provided by the relay optical system to project the intermediate image on the reflection member, wherein
   the second relay mirror is positioned between the first relay mirror and the projection optical system along an optical path from the display to the reflection member.

2. The head-up display according to claim 1, wherein:
   the projection optical system includes a second projection mirror between the relay optical system and the first projection mirror along the optical path.

3. The head-up display according to claim 2, wherein the second projection mirror has a convex reflection surface.

4. The head-up display according to claim 2, wherein the first relay mirror has higher power than any other mirror disposed in the relay optical system and the projection optical system.

5. The head-up display according to claim 1, wherein the intermediate image provided by the relay optical system is larger than the image displayed by the display.

6. The head-up display according to claim 1, wherein the relay optical system as a whole has a positive power.

7. The head-up display according to claim 1, wherein the projection optical system as a whole has a positive power.

8. The head-up display according to claim 1, wherein the display includes an image display and a drive assembly configured to shifting the image display.

9. The head-up display according to claim 1, wherein the relay optical system satisfies a conditional expression (1):

$$1.4 < \beta < 4.0 \qquad (1)$$

where $\beta$ is a lateral magnification of the relay optical system.

10. The head-up display according to claim 1, wherein, among light rays emanating from the display, a reference light ray reaching a center of a viewpoint region for the viewer is inclined with respect to a line orthogonal to a display surface of the display.

11. A moving body comprising:
    a main body;
    a driving unit configured to move the main body; and
    the head-up display as defined in claim 1, and mounted to the main body.

12. The head-up display according to claim 1, wherein the relay optical system forms the intermediate image in the air from the image displayed by the display.

* * * * *